(12) United States Patent
Goodfellow (10) Patent No.: US 6,590,684 B1
(45) Date of Patent: Jul. 8, 2003

(54) OPTICAL SYSTEM (75) Inventor: Robert C Goodfellow, Northants (GB)

(73) Assignee: Marconi Communications Limited, Coventry (GB)

( * ) Notice: Subject to any disclaimer, the term of this patent is extended or adjusted under 35 U.S.C. 154(b) by 0 days.

(21) Appl. No.: 09/391,760

(22) Filed: Sep. 8, 1999

(51) Int. Cl.$^7$ .............................................. H04B 10/00
(52) U.S. Cl. ....................... 359/161; 359/140; 359/173; 359/127; 359/130; 385/24; 385/37; 385/140; 385/123; 385/31
(58) Field of Search ................................. 359/161, 140, 359/173, 127, 130; 385/37, 24, 10, 39, 31, 15, 123, 140

(56) References Cited

U.S. PATENT DOCUMENTS

| | | | |
|---|---|---|---|
| 5,048,909 A | | 9/1991 | Henry et al. |
| 5,671,307 A | * | 9/1997 | Lauzon et al. ................. 385/37 |
| 5,701,188 A | * | 12/1997 | Shigematsu et al. ......... 359/161 |
| 5,982,963 A | * | 11/1999 | Feng et al. ..................... 385/37 |
| 6,148,127 A | * | 11/2000 | Adams et al. .................. 385/37 |
| 6,246,814 B1 | * | 6/2001 | Park ............................... 385/37 |
| 6,271,952 B1 | * | 8/2001 | Epworth ....................... 359/161 |
| 6,288,810 B1 | * | 9/2001 | Grasso et al. ................ 359/127 |
| 6,295,396 B1 | * | 9/2001 | Cao et al. ....................... 385/24 |
| 6,304,691 B1 | * | 10/2001 | Espindola et al. ............. 385/24 |
| 6,307,988 B1 | * | 10/2001 | Eggleton et al. ............... 385/37 |
| 6,330,383 B1 | * | 12/2001 | Cai et al. ........................ 385/37 |
| 6,363,202 B1 | * | 3/2002 | Goodfellow ................ 385/140 |

FOREIGN PATENT DOCUMENTS

| | | |
|---|---|---|
| EP | 0 684 709 A1 | 5/1995 |
| EP | 0 732 819 A2 | 9/1996 |
| EP | 0 695 973 A1 | 9/1997 |
| GB | 2 161 612 A | 6/1986 |
| GB | 2 263 599 A | 7/1993 |
| GB | 2 265 059 A | 9/1993 |
| WO | 96/31024 | 10/1996 |
| WO | 97/37446 | 10/1997 |

* cited by examiner

Primary Examiner—Leslie Pascal
Assistant Examiner—Hanh Phan
(74) Attorney, Agent, or Firm—Kirschstein, et al.

(57) ABSTRACT

A system for individually controlling the chromatic dispersion of one or more wavelength division multiplexed (WDM) optical signals, chromatic dispersion is compensated a plurality if individually controllable differential optical delay elements. An example of a suitable differential optical delay element is a tunable fiber Bragg grating filter whose spectral response varies along the length of the grating, i.e. is chirped in a non-linear fashion. The system may, in addition, comprise one or more second individually controllable optical delay elements arranged so as to compensate for any unwanted delays across the wavelength band of a signal introduced by a first delay element. Optical circulators may be used to route signals into and between the pluralities of differential optical delay elements. This system has the advantage of providing a compact multi-channel selective differential delay suitable for compensating for chromatic dispersion in a WDM optical communications network.

25 Claims, 5 Drawing Sheets

OPTICAL SYSTEM

BACKGROUND OF THE INVENTION

The invention relates to the field of wavelength multiplexed optical communications systems, such as wavelength division multiplexed (WDM) systems, and more particularly to the management and control of the chromatic dispersion of wavelength multiplexed optical signals.

Optical communications systems are a substantial and fast-growing constituent of communications networks. The expression "optical communications system", as used herein, relates to any system which uses optical signals to convey information across an optical medium. Such optical systems include, but are not limited to, telecommunications systems, cable television systems and local area networks (LANs). Optical systems are described in Gower, Ed. *Optical Communications Systems,* (Prentice Hall, N.Y.). Currently, the majority of optical communication systems are configured to carry a single optical channel having a narrow wavelength spectral band over one or more optical waveguides. To convey information from a plurality of sources, wavelength division multiplexing (WDM) is now used. In a WDM system a plurality of optical signals, each typically having a narrow wavelength spectral band, each band being centered on a different wavelength, are carried over a single optical guide.

A typical optical network comprises a plurality of nodes linked by a number of different optical paths for the carriage of WDM signals therebetween. Typically, each path will introduce chromatic dispersion into the signal components passing through it. The term chromatic dispersion is used here to indicate the undesirable effect where components of an optical signal following an optical path experience a different delay according to their wavelength. The differential delay $\Delta t$ introduced between two signal components at a wavelength spacing of $\Delta\lambda=\lambda_1-\lambda_2$ may be expressed mathematically as $\Delta t=t_1-t_2$ where $t_1$ is the delay experienced by a first signal component at wavelength $\lambda_1$ and $t_2$ is the delay experienced by a second signal component at wavelength $\lambda_2$. Chromatic dispersion is commonly introduced by conventional optical fibre. The chromatic dispersion D of an optical path, e.g. optical fibre, (i.e. the tendency of that path to introduce differential delay) may be expressed mathematically as $D=\Delta t/L.\Delta\lambda$, where $\Delta t$ is the differential delay introduced between a pair of optical signal components at a wavelength separation of $\Delta\lambda$ over a length L of the path. A typical value for D for optical fibre in use today is 16 pS/(nm.km).

One problem experienced in optical communication systems is the wide variation in the propagation time or delay experienced by component parts of optical signals following routes through the network according to their wavelength. This leads to a corresponding elongation or spreading of a transmitted data pulse as it passes through the network. In order to overcome this problem there is a need for a means to selectively introduce at a point in the network complementary delays into components of optical signals according to their wavelength.

A prior art method for applying a different delay to various components of a WDM optical signal (which comprises a plurality of signals each having a different optical spectrum, each occupying a different optical channel with a different wavelength band) in an optical network has been to reflect the signal using a long fibre Bragg grating. This method has the disadvantage that it is only capable of introducing a fixed delay. In addition this method requires the creation of a very long grating with a very low chirp (i.e. the resonant frequency of the elements of the grating varies very slowly along the length of the grating) in order to ensure that regions of the grating have elements with a resonance frequency which matches each channel of the WDM signal, and that the variation in resonance frequency along the length of the grating is arranged to reflect the separate elements of the spectrum of the signal so as to compensate for the accumulated differential group delay. These long, gradually chirped, fixed-length gratings have a fixed gradient of delay against spectral width. They are therefore well suited to compensating for the chromatic dispersion for a particular fixed path length. If the different channels of an optical network are routed over different paths through the network then different gradients of delay/spectral width would be required for each of the channels. This requirement for a long grating with a small, linearly varying change in resonant frequency with axial position in the fibre introduces the danger of a local deviation in the chirp where the change in the local resonance frequency reverses for a section of the grating. This would have the disadvantage of introducing an unwanted Fabry-Perot etalon into the grating, which would result in distortion of the signal and impairment in the detection process.

SUMMARY OF THE INVENTION

The present invention provides a system for compensating for chromatic dispersion of an optical signal in which the system comprises a delay means for introducing a differential delay between two spectrally separate components of the optical signal by selectively delaying components of the optical signal by reflection according to the wavelengths of the components; in which the system comprises adjusting means for adjusting the differential delay introduced between two of the spectrally separate reflected components.

In a preferred embodiment the present invention provides a system for also compensating for chromatic dispersion of a plurality of spectrally separate optical signals in a single optical path; in which the system comprises a plurality of the delay means, one per signal; and in which the system comprises adjusting means for adjusting the differential delay introduced between two of the reflected components of each of the optical signals.

In a preferred embodiment the present invention provides a system for selectively delaying one of the plurality of optical signals relative to a second one of the plurality.

In a preferred embodiment the present invention provides a system for selectively providing a group delay of one of the plurality of optical signals at one delay means and to provide a further group delay of the same or opposite sign at a second delay means to provide a greater range of group delay which includes zero overall delay.

References to positive and negative delay cover the alternative cases, i.e. whether the introduced delay increases or decreases with increasing wavelength.

In a preferred embodiment the present invention provides a system comprising an interferometer for separating the plurality of spectrally separate optical signals into a first and a second optical guide; in which the first and second optical guides each comprise the delay means.

In a preferred embodiment the present invention provides a system comprising signal bit error rate measurement means.

BRIEF DESCRIPTION OF THE DRAWINGS

Embodiments of the present invention will now be described by way of example with reference to the drawings in which.

DETAILED DESCRIPTION OF THE PREFERRED EMBODIMENTS

An optical grating is a suitable delay means for selectively delaying spectrally separate components of an optical signal. Characteristics of various optical gratings are shown in FIG. 1.

Figure 1A:
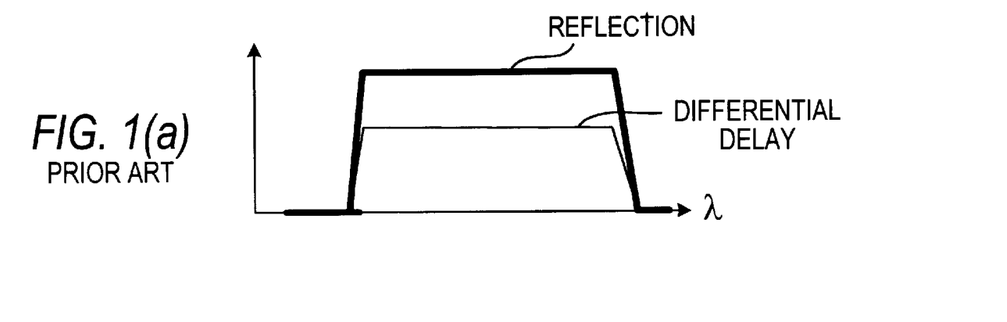
FIG. 1 shows the differential delay characteristic of a number of different optical gratings with 1(a) and (b) relating to the prior art characteristic and 1(c) and (d) relating to embodiments of the present invention.

The optical grating characteristics of FIG. 1 will now be described in greater detail. In the following description the local effective period of a grating is defined as "s" and the position, i.e. the distance along a grating from an arbitrary reference point is denoted as "x". Each part of FIG. 1 illustrates the variation of reflectivity (heavy line) with wavelength and also the variation of differential delay (light line) with wavelength. The information is presented in the form of a graph with reflectivity or differential delay, as the case may be, extending in the vertical axis and wavelength extending in the horizontal axis. Turning to FIG. 1(a), we see the situation with a linearly chirped grating with a uniform level of modulation of refractive index. The term "chirped" is used here to denote that the spacing between adjacent lines of the optical grating varies with distance x along the grating. The term "spacing" as used here refers to the effective period "s" of the optical grating that depends on the actual spacing in combination with other characteristics, most notably the refractive index of the optical guide medium. Hence the term "chirped" denotes that the effective period of the grating varies with distance x along the grating. Typically the effective period will get progressively shorter passing through the grating in one direction and longer in the other direction. By "local modulation of refractive index" we are referring to the degree of change of the refractive index of the grating medium at each line of the grating. The greater the local modulation of refractive index (denoted $\Delta n$) the greater proportion of the signal that will be reflected at that position (i.e. at that line).

In FIG. 1(a) the reflectivity is shown for a constant value of $\Delta n$ (i.e. $\Delta n=w$) and a constant value of chirp (i.e. $s=bx+c$, where b and c are constants). As will be seen from the figure, this results in a uniform value of reflectivity and a uniform differential delay experienced by components of the signal across the spectrum.

Figure 1B:
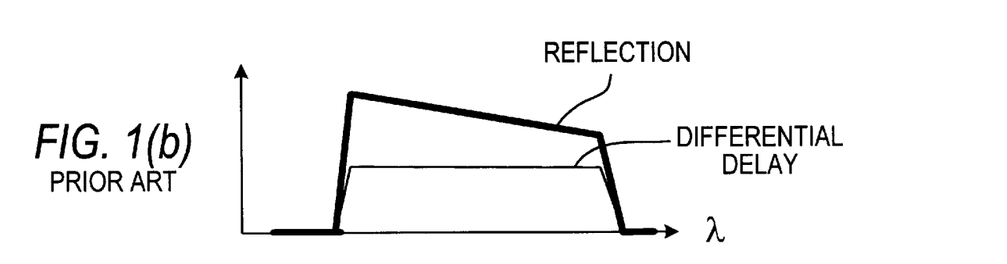

Referring now to FIG. 1(b), the modulation of refractive index $\Delta n$ now varies across the grating (i.e. $\Delta n=qx+w$, where q and w are constants). This results in the reflectivity of the grating varying with wavelength. The chirp is constant as in FIG. 1(a).

The use of optical gratings in which the reflectivity varies across the grating to control the power level of optical signals is described in a copending application "Optical System" filed with the same date as the present application in the name of Marconi Communications Limited.

Figure 1C:
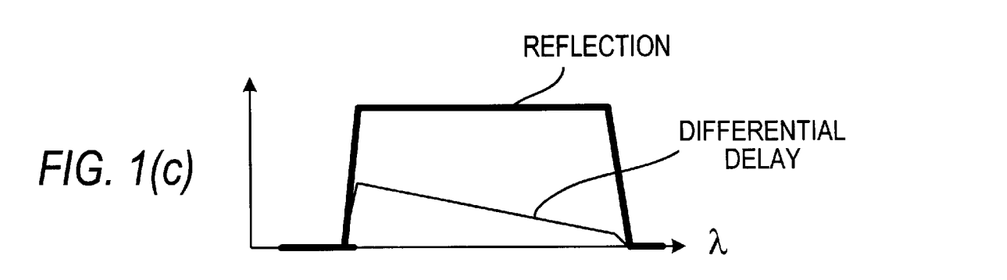
Figure 1D:
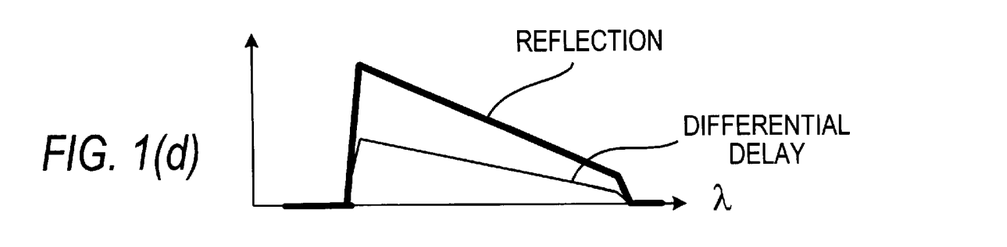

FIG. 1(c) shows the case where the grating has non-linear chirp (i.e. parabolic, where $s=ax^2+bx+c$, where a, b and c are constants). The modulation of refractive index is constant, as in FIG. 1(a). As can be seen from FIG. 1(c), the differential delay introduced by the grating now varies with wavelength (with a slope equal to ax). Hence the parabolically chirped grating of FIG. 1(c) according to a first embodiment of the invention the amount of differential delay introduced between a component at wavelength $\lambda$ and a second component at wavelength $\lambda+\Delta\lambda$ of an optical signal varies with the value of $\lambda$, $\Delta\lambda$ remaining constant. FIG. 1(d) illustrates the case where the chirp is parabolic and the modulation of refractive index varies across the grating. Advantageously, the variation in the modulation of refractive index across the grating may be controlled independently of the degree and the form of the chirp (i.e. linear or parabolic). Although illustrated above as an quadratic equation, the non-linear or parabolic chirp may involve the effective grating period "s" varying with a differential exponent of position x,. e.g. $x^3$.

Advantageously, according to a preferred embodiment, the system comprises a plurality of the gratings, as described above, in a single optical path, e.g. optical fibre or waveguide, for compensating for chromatic dispersion of a plurality of spectrally separate optical signals in the single optical path. Each of the gratings active in a different part of the spectrum and is independently controllable to introduce the optimum differential delay for the relevant signal.

The mechanism by which the chirped grating introduces delay into components of an optical signal according to their wavelength will now be described. The fundamental characteristic of the chirped grating, as indicated above, is that the effective period "s" of the grating varies with distance x along the grating. The use of chirped gratings advantageously allows the spectral response of the grating to be broadened from the single wavelength of the "ideal" grating (where the effective period "s" of the grating is a constant) to a defined waveband. In practical terms the ideal grating is of little use as the wavelength of the optical carrier transferring information through an optical network cannot be precisely controlled and may in fact vary as the signal propagates through the network. Considering the case of a chirped grating where the effective periods increases moving through the grating in a first direction (i.e. corresponding to an increase in the value of x), components of an optical signal with a shorter wavelength would tend to be reflected close to the entry end of the grating i.e. on encountering the effective period with a matching resonance wavelength. In contrast, components of the optical signal with a longer wavelength will travel further through the grating before encountering an effective period with a matching resonance wavelength to reflect them. Hence in the reflected signal components with a shorter wavelength will follow a shorter path through the grating than those components with a longer wavelength. This introduces a differential delay between the various components of the optical signal due to path length difference in addition to the delay due to the build-up time of energy within the resonator (the region of the fibre grating where the resonant frequency matches the optical frequency of the signal). This delay due to storage of energy is well known. In thin-film filters it is probably the dominant delay process. In a capacitor/inductor filter it is the main explanation for delay. It would relate to the Q factor for a simple harmonic resonator Here the term 'grating' refers to a periodic perturbation of the properties of the optical guide (used in a broad sense to include wave guides and optical fibres), that results in a wavelength selective response. The perturbation can be to any parameter of the optical guide that influences the propagation of the light guided through the structure, and includes variations in refractive index and physical shape. Light can only travel in an optical guide in particular propagation modes, and the effect of the grating will depend on which mode the light is in. Hence to determine the effect of the grating, one must know the 'effective refractive index' seen by the specific guided mode being propagated. This allows the 'effective period' of the grating to be defined for a particular guided mode. It is convenient to discuss the effect of the grating in terms of the resonant frequency or wavelength of a particular region thereof. In any such region, many lines may co-operate in producing a reflection and in a related storage of energy.

Figure 2A:
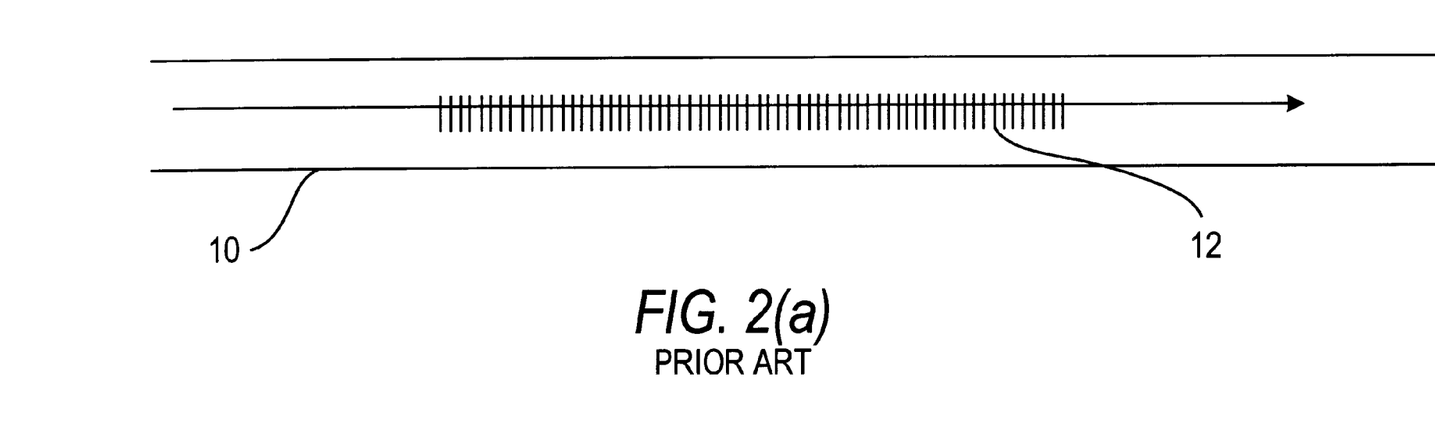
FIG. 2 shows in cross-section an optical fibre and a fibre Bragg Grating of the prior art.
Figure 2B:
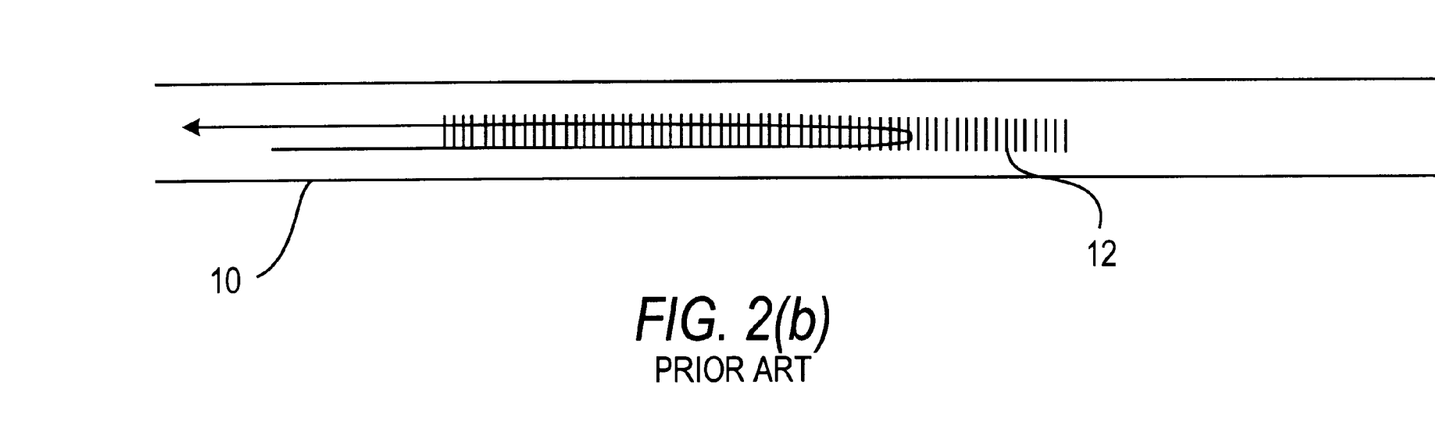

The optical grating may advantageously comprise a fibre Bragg grating as shown in FIG. 2 consisting of an optical fibre 10 in which a series of variations (represented diagrammatically by lines 12) in the refractive index of the material (e.g. glass) of the optical fibre are formed. The lines form a diffraction grating that acts to pass incident radiation of most wavelengths (as represented by the arrow of FIG. 2a) and to reflect incident radiation of particular wavelengths (as represented by the arrow of FIG. 2b), depending on the effective period. Hence the fibre Bragg grating acts as an optical filter. The effective period of the fibre Bragg grating may be arranged to vary along the length of the grating, despite equal line spacing, by varying the refractive index of the grating medium and/or by variations in physical dimensions of the optical guide in the grating region (e.g. the diameter of an optical fibre core or the width or depth of a waveguide).

An alternative form of optical filter comprises multi-layer dielectric filters acting as selectively reflective mirrors. In practice a plurality of optical filters may be arranged in series with each successive filter active in a different part of the spectrum. Typically, light reflected by a first multi-layer dielectric filter will become incident on the next multi-layer dielectric filter in the series, whereas light passed by a first FBG filter will become incident on the next FBG filter in the series.

The term "light" is used here without implying restriction to visible radiation but extends to radiation of any suitable wavelength. Advantageously, the filter will be formed in low loss fibre and designed for low transmission loss ($\alpha_{thru}$). This low transmission loss is important where a number of such filters are connected in series.

Suitable filters could, for example, be implemented in optical guides (by which is meant optical fibres or waveguides) formed in silica, silicon, a group III-V alloy or polymer and the filtering achieved by forming a phased grating by etching, embossing, exposure to ultra-violet radiation using holography or with a phase mask or aperture mask. Each type of filter has the ability to be adjusted or "tuned", i.e. the spectral position of the reflection band may be shifted to higher or lower wavelengths by applying a stimulus to the filter. This stimulus could, for example, be electrical, mechanical or thermal. The degree or form of chirp (i.e. the variation of effective period "s" with distance x along the grating) may also be adjusted or "tuned" by application of the same stimulus to the filter.

This adjustment may be achieved by stretching or compressing the filter medium such that the local effective period varies as a result of the physical spacing of the lines changing. The grating can also be tuned thermally, which has two effects: first the grating expands/contracts changing the physical spacing of the lines and hence the effective spacing, secondly, the refractive index of the medium of the optical guide changes by the thermo-optic effect, again affecting the effective period. It is also conceivable that special fibres could be produced to make use of an electro-optic effect, whereby an applied electric field changes the refractive index of the optical guide, thus tuning the grating. Also possible are using a magnetic field (the magneto-optic effect) or another optical beam (the nonlinear intensity dependent refractive index) to change the local refractive index. Such adjustment can advantageously be used to change the differential delay introduced between signal components at different wavelengths, i.e. by changing the effective distance along the grating between lines corresponding to the wavelength $\lambda_1$ of a first component and lines at a spacing corresponding to the wavelength $\lambda_2$ of a second component.

In more detail, tuning of the filter may be achieved by depleting charge from the region of the grating or by injecting an electronic charge so as to change the complex refractive index of the filter, by varying the strain applied by means of a piezo or magneto strictive actuator, by a differential heated beam type actuator or by varying the temperature of the filter by means of a heater or cooler.

A variable optical delay means according to the present invention may advantageously comprise a tunable optical filter of a type described above. As can be seen from FIG. 1, in the pass band (represented by those characteristic line segments lying on the horizontal axis) the filter acts to pass nearly all the incident radiation; the reflectivity of the filter being at a relatively low level ($R_{pass}$) and hence introduces virtually no delayed reflected components. Between the lower pass band and the upper pass band lies the reflection band represented by line segments in the form of a "top hat" representing an increase in reflectivity from the passband value $R_{pass}$ up to a maximum value $R_{max}$. This "top hat" section constitutes the active region of the filter characteristic, i.e that part used to selectively reflect optical signals. As shown in FIG. 1, the reflectivity characteristic has a substantially constant gradient. It is this active region which is exploited by the present invention for controlling the delay of components of an optical signal by reflection.

Figure 3:
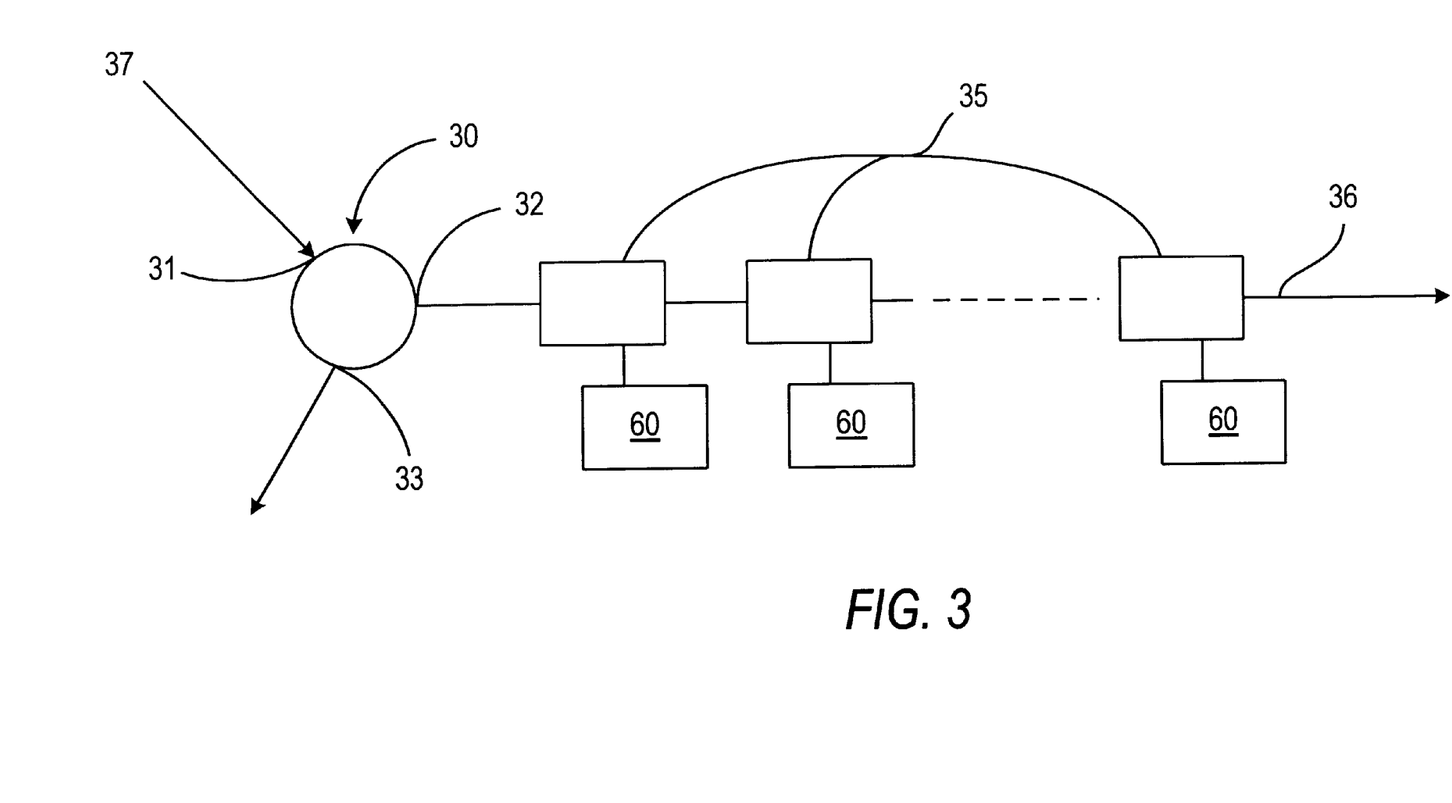
FIG. 3 shows a first system for use of a differential optical delay means according to the present invention.

A system for individually controlling the differential delay of wavelength components of a single signal or of each of a plurality of optical signals, each signal allocated to a different part of the spectrum, e.g. wavelength division multi-plexed (WDM), will now be described with reference to FIG. 3. The "selective differential delay" system of FIG. 3 comprises optical circulator 30 which is provided with three ports, input port 31, filter port 32, and output port 33. A number of WDM optical signals 37 are input at port 31 of the optical circulator. Filter port 32 is connected to a plurality of tunable chirped optical filters 35 (as, for example, described above) connected in series in a suitable optical guide 36. Each of the tunable chirped filters is individually tunable, as described above, and appropriate control means 60 are provided to control the tuning of each filter on an individual basis, e.g. by applying the appropriate level of stimulus to each one.

The signals may be separate channels of a WDM signal. A different fibre Bragg grating may be provided for each of the channels of the WDM signal in a serial arrangement or a parallel/serial arrangement of gratings. The length of grating may be made considerably less than the long WDM dispersion gratings of the prior art, because linearly chirped grating elements for the wavelength band of each WDM channel are required instead of for the whole WDM signal spectrum.

The operation of the system of FIG. 3 will now be described. Input optical signals 37 pass through the circulator from port 31 to emerge at port 32 thereof. The optical signals then pass along optical guide 36 and encounter the series of tunable chirped optical filters 35. Each of the plurality of filters 35 has a reflection band corresponding to the wavelength of a particular one of the optical signals 37. This means that each input signal will pass through all but one of the optical filters 35 virtually unchanged. Upon reaching the optical filter 35 whose active region corresponds to the wavelength band of that signal, the signal will experience a reflection. This reflection at the chirped grating effects a differential delay between the spectrally spaced wavelength components of the incident signal so reflected. If the filter is in the un-tuned (i.e. rest) state, the input signal will experience a "normal" level of differential delay corresponding to the degree of chirp of the filter in the rest state. This "normal" level of differential delay may be selected to accommodate the known or predicted characteristics of the relevant optical path. If, however, it is determined that the chromatic dispersion associated with a particular signal requires a greater or lesser degree of differential delay by way of compensation compared with the norm, the relevant filter may be tuned such that the chirp is adjusted such that the differential delay in the waveband corresponding to that particular input signal is increased or decreased by an appropriate amount to compensate for that particular chromatic dispersion.

The portions of the input signals reflected by the plurality of filters 35 return via optical guide 36 to optical circulator 30, to re-enter optical circulator 30 at port 32 thereof and pass through the optical circulator to emerge at port 33 thereof where they are output. The portions of the optical input signals 37 passed by the series of optical filters 35 will continue along optical guide 36 in the direction away from optical circulator 30 and are thus effectively discarded.

Figure 4:
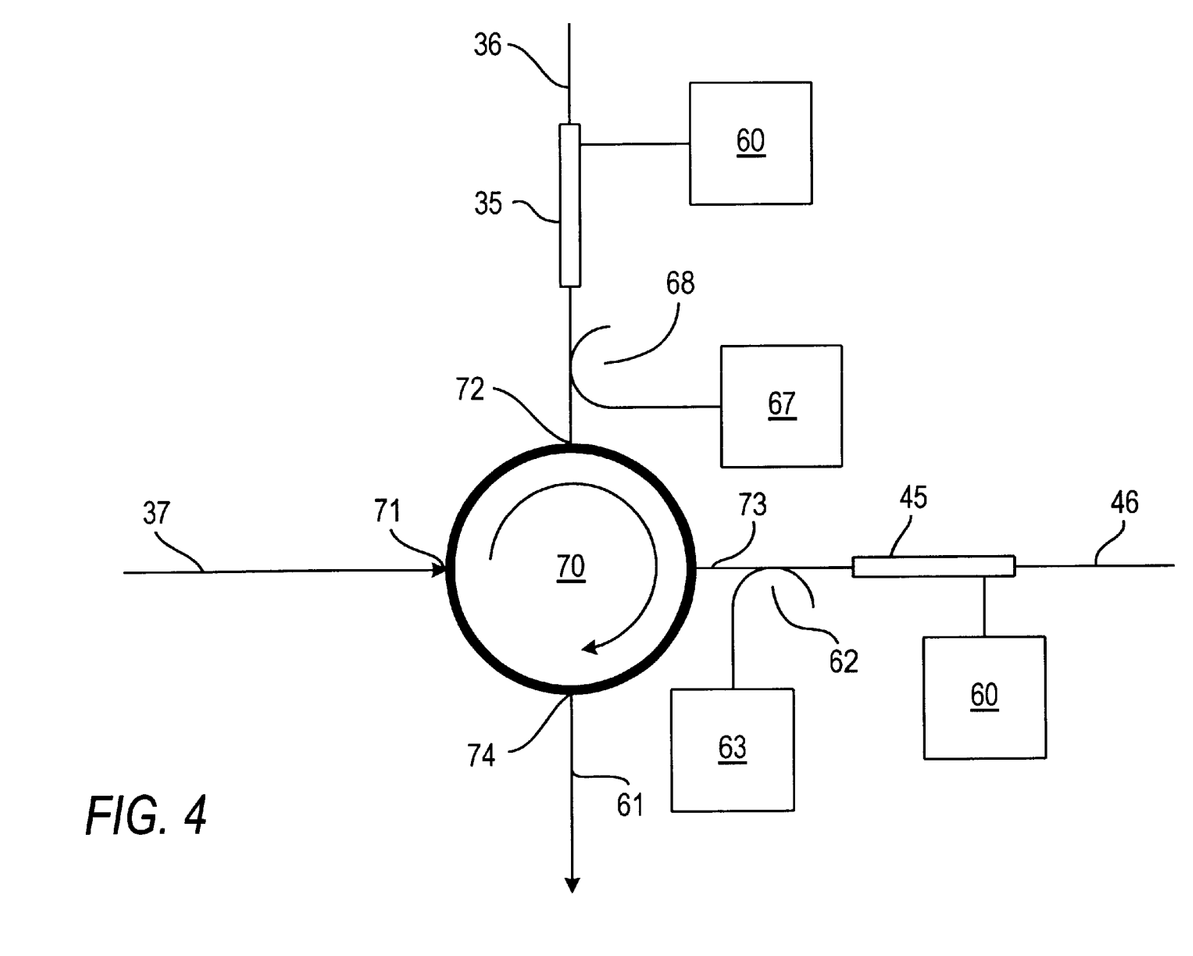
FIG. 4 shows a further system for use of a differential optical delay means according to the present invention.

A further selective differential delay system according to the present invention is illustrated in FIG. 4. According to the system of FIG. 4, the output may be obtained from the signals reflected at both the plurality of filters 35 and 45 in turn. The further selective differential delay means system of FIG. 4 comprises optical circulator 70 which is provided with four ports, input port 71, first filter port 72, second filter port 73 and output port 74. WDM optical signals 37 are input at port 71 of the optical circulator 70. First filter port 72 is connected to plurality of optical filters 35 in optical guide 36. Second filter port 73 is connected to second plurality of optical filters 45 in optical guide 46. The portions of the input signals reflected by the plurality of filters 35 back to port 72 of optical circulator 70 emerge at port 73 thereof and then pass along optical guide 46 and encounter the plurality of optical filters 45. The portions of input signals 37 reflected by the plurality of filters 45 return via optical guide 46 to re-enter the optical circulator 70 at port 73 thereof and pass through the optical circulator to emerge at port 74 thereof where they are output.

Figure 5:
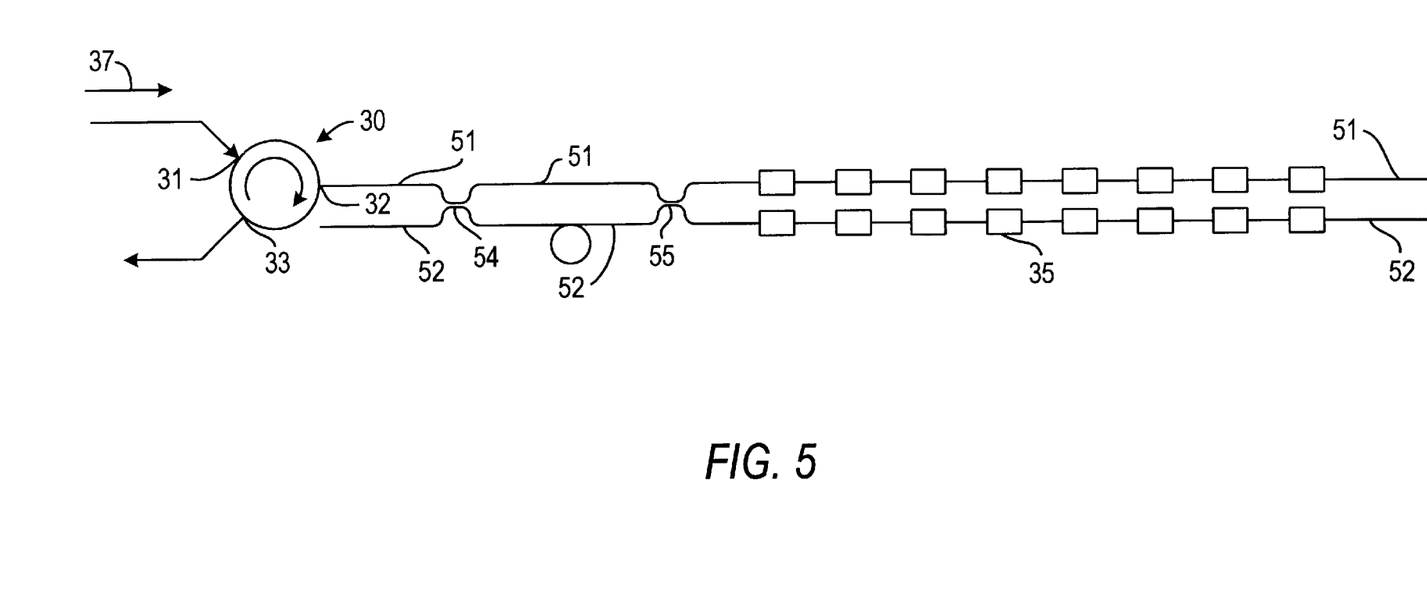
FIG. 5 shows a further system for use of a differential optical delay means according to the present invention.

A further selective differential delay means according to the present invention is illustrated in FIG. 5. Features of FIG. 5 which are common with earlier Figures are given the same reference numerals and will not be described further here. Comparing the arrangement of FIG. 5 with that of FIG. 3, input signals 37 output from optical circulator 30 at port 32 thereof pass along optical guide 51 to Mach-Zehnder interferometer (or interference filter) 54, 55. The interferometer comprises optical guide 51 combined with a second optical guide 52 which are brought into contact at points 54 and 55 leading to a sharing of optical input signals 37 between the two optical guides. Each of optical guides 51, 52 continue separately from contact point 55, each continuation containing a different set of filters 35 corresponding to the filters of the first series, i.e. as described with reference to FIG. 3. As is known in the prior art, the length of optical guide 51 between contact points 54 and 55 is arranged to be slightly different from the length of optical guide 52 between the same two points of contact. This difference results in two modes of interaction at contact point 55 between the parts of input signals 37 travelling via optical guide 51 and the parts travelling via optical guide 52. Depending on the wavelength of a particular optical signal the two parts of each particular signal will have a particular phase relationship at contact point 55 resulting in that particular signal continuing along either optical guide 51 or optical guide 52 so as to enter one or other set of optical filters 35.

As described above, two separate paths are established between the first and second interferometers 54, 55 and 56, 57, i.e. a first path via optical guide 51 and, a second path via optical guide 52 each of these paths comprising a different series of optical filters 35. The first set of optical filters 35 i.e. those in optical guide 51 are arranged to selectively reflect a first set of signals from input signals 37 whereas the second set of optical filters 35, i.e. those in optical guide 52 are arranged to selectively reflect a second set of signals from input signals 37, this second set comprising all of the signals not included in the first set.

Advantageously the two sets of signals could be arranged such that spectrally adjacent signals do not belong to the same set so that the spectral spacing of signals of a particular set are twice that of the input signals 37 as a whole. This arrangement advantageously results in reduced cross-talk.

The operation of the arrangement of FIG. 5 as a tunable differential delay means will now be described. Each of filters 35 in paths 51 and 52 will selectively reflect light according to wavelength, as described above with reference to earlier embodiments and will thus introduce particular amounts of differential delay between the wavelength components of each reflected signal. Signals reflected by a filter of series 35 travel back down optical path 51 or 52, as the case may be, to Mach-Zehnder interferometer 54, 55 from where they will be passed via the continuation of optical guide 51 back to optical circulator 30. The signals will enter optical circulator 30 at port 32 thereof and pass through the optical circulator to emerge at port 33 thereof where they are output.

According to a further embodiment of the present invention, filter arrangement 51,52, 54,55 with filters 35 may be repeated at ports 72 and 73 of the four port circulator of FIG. 4, but with the series of filters 35 arranged at port 72 so that light enters from the opposite end (high/low or low/high frequency first) to the series of filters 45 arranged at port 73 (i.e. the filters of the two series are arranged as regards chirp so that light from optical circulator 70 enters each filter of a first one of the two series at the short-wavelength end thereof and enters each filter of the other one of the two series of filters at the long-wavelength end thereof).

With this arrangement differential delay introduced by the first series of filters 35 may be compensated by a complementary differential delay introduced by the second series of filters 45.

In the arrangements of the selective differential delay means systems described above with reference to FIG. 5, the Mach-Zehnder interferometer could be replaced by one, or a combination of, Fabry-Perot etalons or similar.

A further selective differential delay system according to the present invention is illustrated in FIG. 6. Features of FIG. 6 which are common with earlier figures are given the same reference numerals and will not be described further here. FIG. 6 shows a monitoring arrangement 62–66.

The filters may, advantageously, comprise ramped attenuation-profile filters of the type described in co-pending application GB9915234.0 in the name of Marconi Communications, the contents of which are incorporated herein by reference. This provides the possibility of individually compensating for chromatic distortion across the bandwidth of each WDM signal 37 with a complementary power level correction of each WDM signal.

A further selective differential delay system according to the present invention will now be described in referring back to FIG. 4. FIG. 4 also shows first and second optical splitters 62, 68 and first and second measurement units 63, 67. First measurement unit 63 is connected via first optical splitter 62 to optical guide 46. The signals reflected by plurality of filters 45 back to optical circulator 70 pass through optical splitter 62 where they are split with a small, set proportion of each signal taken to measurement unit 63. The remainder of the signals continue along optical guide 46. Second measurement unit 67 is similarly connected via second optical splitter 68 to optical guide 36 at the end of first series of filters 35 adjacent optical circulator 70 so as to detect a small, set proportion of signals reflected at plurality of filters 35 back towards optical circulator 70. Measurement units 63 and 67 provide information to a control unit (not shown) on the chromatic dispersion of each of the measured signals. The control unit (not shown) outputs control signals (not shown) to the filter tuning actuators (not shown) to create the required differential delays to give the desired chromatic dispersion compensation for each WDM signal.

As chromatic dispersion of an optical signal produces pulse shape distortion, the transmission bit error rate will rise for non-chromatic dispersion compensated links. According to a preferred embodiment, first and second measuring units 63, 67, sample the bit-error rate using conventional test equipment to provide a metric to determine chromatic dispersion compensation in a feed-back arrangement, as described above.

According to a further embodiment, the delay means or each delay means of the plurality of delay means is replaced by a pair or a plurality of pairs of the delay means (as the case may be) arranged to cooperate such that an optical signal incident at a first delay means of the or each pair is subsequently incident at the second delay means of the pair. This allows more flexibility in controlling chromatic distortion and also allows for control of chromatic distortion in the case where the delay means comprise tunable filters also used for controlling the power levels/amplitudes of the signal.

According to a further embodiment, the adjusting means (chirp control means) 60 adjusts both delay means of a pair to produce a particular chirp in the first chirped optical grating of a pair and a second particular chirp in the second optical grating of the pair. Advantageously the two chirps are of different form, thus providing more flexible control of differential delay allowing positive, negative and zero additional differential delay to be added to each of the channels of the WDM signal.

Although, as stated above, a non-linear chirp is provided by the chirp adjusting means, the grating, according to a further embodiment exhibits a linear chirp when the optical grating is adjusted to a first state and adopts a non-linear chirp when tuned or adjusted to a second state. Typically, the first state is a rest state, i.e. a state where the actuators that vary the chirp of the grating are not energized.

According to a further embodiment, the medium in which the grating is formed, e.g. optical fibre or waveguide material, exhibits different stiffness (i.e. a different tendency to change shape in response to a common stimulus) in different sections of the optical grating. Such a characteristic is useful in producing the desired non-linear chirp. According to an alternative mechanism, the adjusting means comprises thermal means for introducing different thermal expansions into parts of the optical guide coincident with different sections of the optical grating.

The system of the present invention may also be arranged to selectively delay one optical signal relative to a second, spectrally separate signal by arranging for the chirped grating of the invention to cover the wavebands of both signals.

I claim:

1. A system for compensating for chromatic dispersion of an optical signal, comprising: a pair or a plurality of pairs of a delay means for introducing a differential delay between two spectrally separate components of the optical signal by selectively delaying components of the optical signal by reflection according to wavelengths of the components; and adjusting means for adjusting a differential delay introduced between two of the spectrally separate reflected components, the delay means being arranged in combination such that the optical signal incident at a first delay means of the or each pair is subsequently incident at a second delay means of the respective pair.

2. The system as claimed in claim 1, operative for also compensating for chromatic dispersion of a plurality of spectrally separate optical signals in a single optical path; in which the system comprises a plurality of the delay means, one per signal; and in which the adjusting means for adjusting the differential delay is introduced between the reflected components of each of the optical signals.

3. The system as claimed in claim 2, for selectively delaying one of the plurality of optical signals relative to a second one of the plurality.

4. The system as claimed in claim 3, for selectively providing a group delay of one of the plurality of optical signals at a first delay means, and to provide a further group delay of the same or opposite sign at a second delay means to provide a greater range of group delay which includes zero overall delay.

5. The system as claimed in claim 2, in which the system comprises an interferometer for separating the plurality of spectrally separate optical signals into a first and a second optical guide; and in which the first and second optical guides each comprise the delay means.

6. The system as claimed in claim 5, in which those ones of the plurality of signals that are spectrally adjacent to the signals separated into the first optical guide are separated into the second optical guide.

7. The system as claimed in claim 2, comprising an optical circulator for passing the optical signals from the first delay means of a respective pair to the second delay means of that pair.

8. The system as claimed in claim 2, comprising an optical circulator or optical isolator for passing the optical signals to the first delay means of a respective pair.

9. The system as claimed in claim 2, in which the optical signals are wavelength division multiplexed (WDM).

10. The system as claimed in claim 1, in which the or each delay means comprises an optical grating.

11. The system as claimed in claim 10, in which the adjusting means comprises chirp control means for producing or modifying a chirp in the respective optical grating.

12. The control system as claimed in claim 11, in which the chirp control means comprises means for producing a particular chirp in a first chirped optical grating of a pair, and a second particular chirp in a second optical grating of the respective pair; and in which the first and second chirps are of different form.

13. The system as claimed in claim 11, in which each chirp is non-linear.

14. The system as claimed in claim 11, in which each chirp is linear when the respective optical grating is adjusted to a first state, and non-linear when the respective optical grating is adjusted to a second state.

15. The system as claimed in claim 14, in which the first state is a rest state.

16. The system as claimed in claim 14, in which the or each optical grating is formed in an optical guide, and in which parts of the optical guide coincident with different sections of the optical grating have different degrees of stiffness.

17. The system as claimed in claim 16, in which the or each optical grating is formed in an optical guide, and in which the adjusting means comprises thermal means for introducing different thermal expansions into the parts of the optical guide coincident with the different sections of the optical grating.

18. The system as claimed in claim 1, in which the delay varies in a substantially linear fashion with wavelength.

19. The system as claimed in claim 1, in which the delay varies in a non-linear fashion with wavelength.

20. The system as claimed in claim 1, in which the delay varies exponentially with wavelength.

21. The system as claimed in claim 1, comprising signal bit error rate measurement means.

22. The system as claimed in claim 21, comprising control means for controlling the operation of the adjusting means based on information supplied by the measurement means.

23. An optical communications system using the system as claimed in claim 1.

24. A telecommunications system using the system as claimed in claim 1.

25. A system for compensating for chromatic dispersion of a plurality of spectrally separate optical signals in a single optical path, comprising: a plurality of delay means, one per signal; and adjusting means for adjusting a differential delay introduced between reflected components of each of the optical signals, the delay means comprising a pair or a plurality of pairs, the delay means of the or each pair being arranged in combination such that an optical signal incident at a first delay means of the or each pair is subsequently incident at a second delay means of the pair.

* * * * *